UNITED STATES PATENT OFFICE.

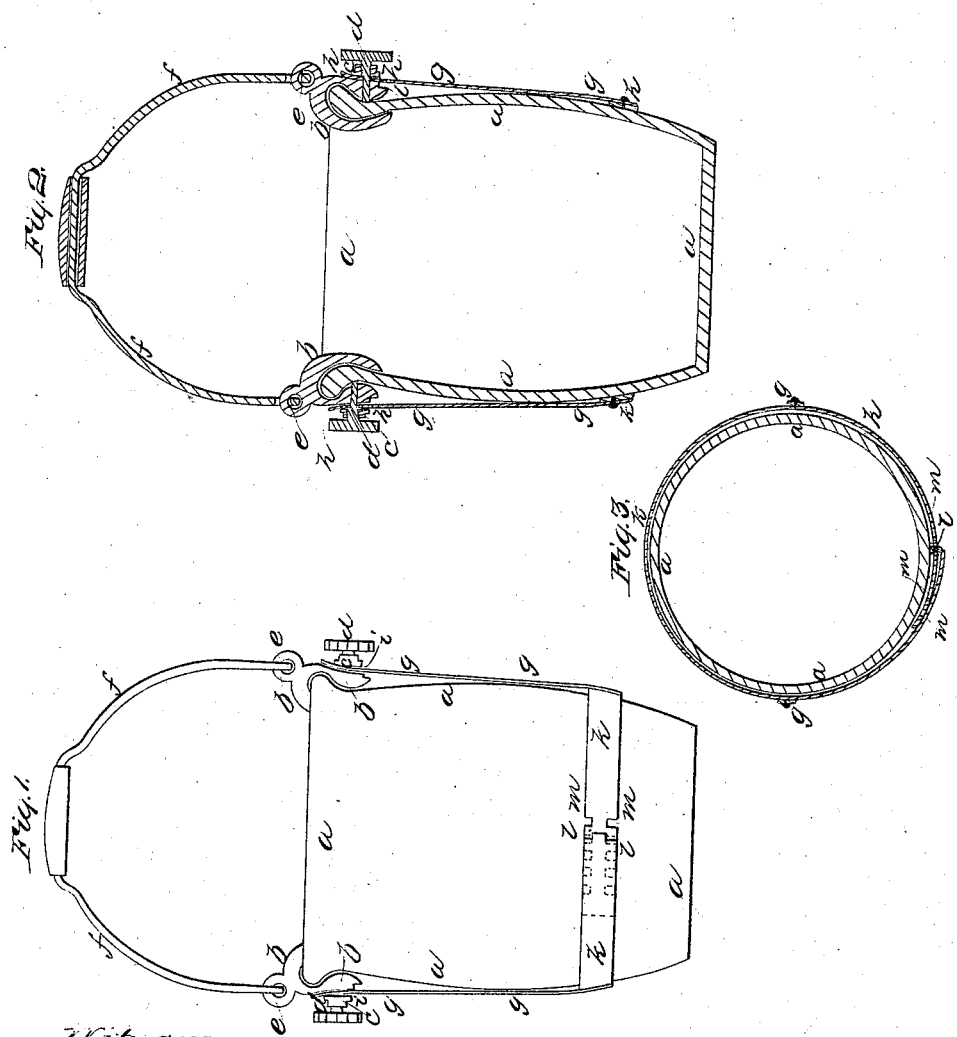

ANSON D. CROCKER, OF BOSTON, MASSACHUSETTS.

IMPROVED BAIL FOR KETTLES AND OTHER VESSELS.

Specification forming part of Letters Patent No. 58,224, dated September 25, 1866.

*To all whom it may concern:*

Be it known that I, ANSON D. CROCKER, of Boston, in the county of Suffolk and State of Massachusetts, have invented certain new and useful Improvements in Bails for Kettles and other Vessels; and I do hereby declare that the following description, taken in connection with the accompanying plate of drawings, hereinafter referred to, forms a full and exact specification of the same, wherein I have set forth the nature and principles of my said improvements, by which my invention may be distinguished from all others of a similar class, together with such parts as I claim and desire to have secured to me by Letters Patent.

The present invention consists in so constructing and arranging a bail or handle as to be readily attached to or detached from any description of vessel, and has for its principal object the obviating of the inconvenience and delay heretofore experienced in the various occupations in which kettles and other like vessels are used from the want of any suitable means of lifting and transporting the vessels from one place to another. This desideratum is attained by my improvements in the manner which I will now proceed to describe in detail.

My improvements are represented in the accompanying plate of drawings, of which Figure 1 is an elevation of a vessel with my improved bail attached. Fig. 2 is a central vertical section of the same; and Fig. 3 is a horizontal section through the lower portion of the vessel, showing the manner of fastening a band thereto.

$a\ a\ a$ in the drawings represent a vessel, to the upper rim of which are connected curved clamps $b\ b$, so formed as to allow one arm of each clamp $b\ b$ to extend a short distance on the inside, and the other an equal distance on the outside, of the vessel $a\ a\ a$.

On the outer arm of each clamp $b\ b$ a nut, $c\ c$, is formed to receive a screw, $d\ d$, which works through it and the outer arm of the clamp $b\ b$, and bears against the outside of the vessel in such a manner as to securely hold it. On the top of the clamps $b\ b$ eyelets $e\ e$ are formed, in which are attached the ends of a suitable bail or handle, $f\ f$.

From the foregoing description it will readily be seen that the bail can at any time easily be attached to the desired vessel by merely adjusting the clamps $b\ b$ over its rim and tightening the screws $d\ d$, and by unloosening the screws $d\ d$ the bail may be as readily disengaged from the vessel.

In order that my device may be used on a vessel having no rim or molding formed on its edge, and of a tapering shape, or that a greater support may be given to the bail, I form on each side of the vessel $a\ a\ a$ vertical band, $g\ g$, the upper end of which passes through a slot, $i\ i$, formed in the nut $c\ c$, where it is held by the screw $d\ d$ passing through one of a series of apertures, $h\ h$, which are made at intervals in the upper end of the band $g\ g$, for the purpose of adjusting the band $g\ g$ to any desired length.

The lower end of the vertical band $g\ g$ is attached to a circular band, $k\ k$, passing around the vessel $a\ a$ near its bottom. The circular band $k\ k$ is so made as to readily be adjusted to any-sized vessel by means of curving or forming hooks $l\ l$ on one of its ends, which catch and hold in notches $m\ m$, formed in the sides of the other end of the band $k\ k$, as fully shown in Fig. 3.

Having thus described my improvements, I shall state my claims as follows:

What I claim as my invention, and desire to have secured to me by Letters Patent, is—

1. In combination with a bail or handle, adjustable clamps, constructed and arranged to fit upon the rim of and hold the receptacle to which they are attached, as described.

2. In combination with the above, the vertical bands $g\ g$ and horizontal band $k\ k$, as described, and for the purpose specified.

3. Making the bands $g\ g$ and $k\ k$ adjustable by the means hereinabove described, and for the purpose specified.

ANSON D. CROCKER.

Witnesses:
JOSEPH GAVETT,
SAML. M. BARTON.